Figure 1:
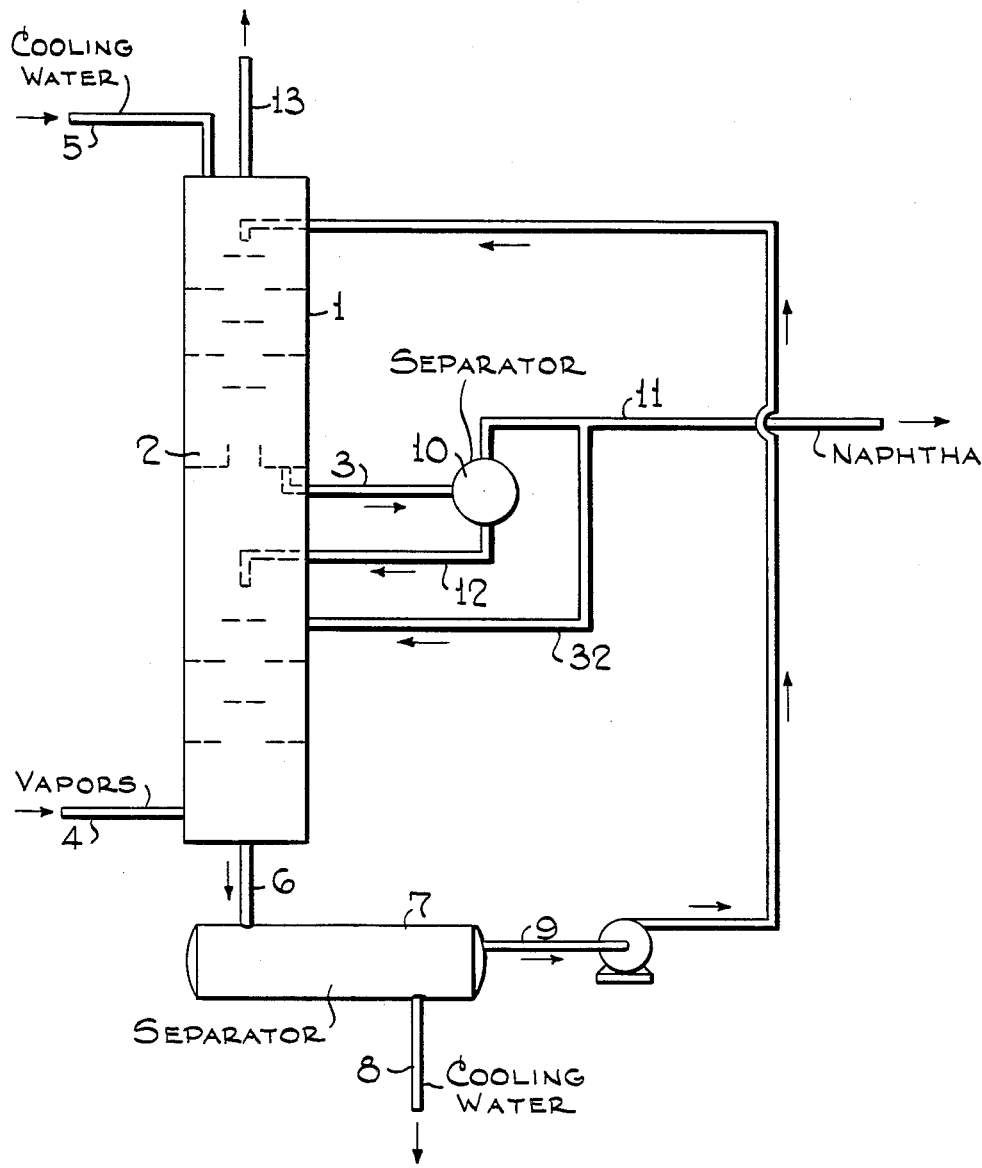

Aug. 23, 1955 — W. K. LEWIS ET AL — 2,715,948
DIRECT CONTACT CONDENSER AND ABSORBER
Filed May 22, 1951 — 2 Sheets-Sheet 1

United States Patent Office 2,715,948
Patented Aug. 23, 1955

2,715,948

DIRECT CONTACT CONDENSER AND ABSORBER

Warren K. Lewis, Newton, and Edwin R. Gilliland, Arlington, Mass., and William N. McCurdy, Jr., Linden, N. J., assignors to Esso Research and Engineering Company, a corporation of Delaware Application May 22, 1951, Serial No. 227,652

4 Claims. (Cl. 183—120)

This invention concerns a condensation process embodied in an improved form of condensing apparatus for the liquefaction of a gaseous stream. The condenser of this invention depends upon the so-called direct contact principle, requiring the actual contact of a cooling medium such as water with the gas to be condensed. It is a particular feature of this invention that the direct contact of the cooling medium and the gas to be condensed is carried out so as to minimize the loss of uncondensed gas, and depends upon the use of a particular absorption menstruum in combination with the condensing medium.

In a great many phases of the chemical processing industry, it is necessary to provide condensing equipment to liquefy gaseous process streams. For the most part, the requisite condensation is conventionally carried out by passing a cooling medium and the gas to be condensed along opposite sides of a heat conductive surface in heat exchange relationship. However, the conduct of condensation by heat exchange in this manner is characterized by certain disadvantages. For example, when it is necessary to employ salt water or sea water as the cooling medium, problems of salt deposition on the heat exchange surfaces are encountered if it is necessary to heat the cooling water above about 110° F. to secure the desired condensation. Because of the practical limitation that sea water cannot be heated above about 110° F. in heat exchangers due to salt deposition, certain condensation problems require enormous volumes of sea water when employing conventional condensation apparatus. This creates a real economic burden, since the apparatus required for processing the sea water is relatively expensive. It is the principal object of this invention, therefore, to provide a more economical condensation process, enabling utilization of smaller quantities of water to achieve equivalent condensing results, thus resulting in savings in the associated water processing equipment.

In accordance with this invention, the desired objectives are achieved by a particular type of apparatus embodying the principles of a direct contact condenser. In a direct contact condenser, a gas stream to be condensed is brought into direct fluid contact with the cooling or condensing medium. As a result, direct cooling without the necessity for heat exchange surfaces is achieved. However, in the direct cooling apparatus heretofore known to the art, the condensation achieved by means of the direct contact has been of such a nature as to permit the escape, without condensation, of a substantial percentage of the condensable gases. This has occurred as conventional countercurrent direct contact condensing equipment does not include provision for obtaining equilibrium between the condensed and uncondensed gas components of the original gas stream passed into the direct contact condenser. In the conventional concurrent direct contact condenser, equilibrium between the off gas and condensed gas components is achieved, but in order to secure a reasonably low temperature and secure maximum condensate, an enormous quantity of cooling water is required. It is therefore a more specific object of this invention to provide a novel type of direct contact condenser capable of minimizing the loss of condensable gases from the condenser by obtaining substantial equilibrium between the off gases and the condensed product at the lowest temperature of the available cooling water, while using a minimum amount of cooling water.

In accordance with this invention, apparatus is provided consisting of a vertical tower essentially divided into an upper and a lower section. As direct contact of the condensing medium and the gas to be condensed occurs in both of these sections, the apparatus may be considered to be a two-stage direct contact condenser. In this condenser, the cooling medium, such as water, is injected at the top to pass downwardly through both sections of the condenser for ultimate removal at the bottom. The gas to be condensed is introduced to the bottom of the condenser and passes generally upwardly through the condenser. Provision is made at an intermediate portion of the apparatus for the accumulation and drawoff of a liquid condensate. This liquid condensate drawoff divides the tower into the two sections described. The division is such that uncondensed gases may pass from the lower section of the condenser to pass through the upper section. In accordance with this invention, the cooled, liquefied heavy ends portion of the initial gas feed is withdrawn from the lower section of the condenser and is re-introduced to the top of the condenser. In the upper portion of the condenser, this recycled liquid heavy ends acts as a condensing absorbing medium for the gaseous product passing upwardly through the upper portion of the condenser. The liquid heavy ends including absorbed gases may then be withdrawn from the intermediate liquid drawoff.

Figure 2:
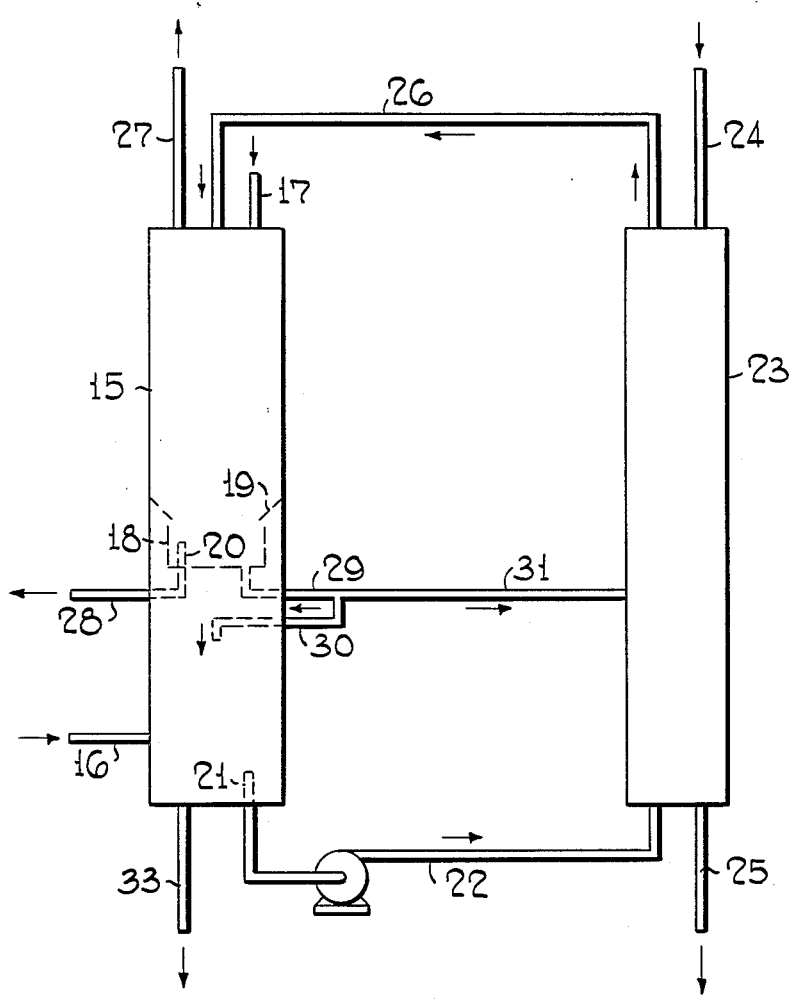

The nature of this invention will be fully understood by reference to the following description related to the accompanying drawings, in which:

Figure 1 diagrammatically illustrates one embodiment of this invention, while Figure 2 shows a second embodiment of the invention. For simplicity, valves required in the different lines associated with the apparatus, have not been illustrated.

For the purposes of illustration, it may be assumed that the gas stream to be condensed constitutes the overhead product stream from the fractionator of a catalytic cracking operation. Thus, in the conventional catalytic cracking of a gas oil feed stock, the products of the catalytic cracking operation are passed to a fractionator. The fractionator is conventionally operated to permit removal of a bottoms product called slurry oil, while side stream products may be withdrawn consisting of gas oil, light cycle gas oil and heavy naphtha. The uncondensed portions of the product stream, removed as the overhead product from the fractionator consist of the resulting gasoline product together with lighter hydrocarbons ranging downwardly in molecular weight to methane and including some hydrogen. The weight percent composition of a typical overhead stream from a catalytic cracking fractionator is presented in Table I.

TABLE I

*Composition of overhead from catalytic cracking fractionator*

| | |
|---|---|
| Crude gasoline fraction ($C_5$ to 430° F. fraction) | percent__ 56 |
| Fraction more volatile than above | do____ 44 |
| Inert gases | weight per cent__ 8 |
| Hydrogen | do____ 8 |
| Methane | do____ 11 |
| $C_2$ hydrocarbons | do____ 9 |
| $C_3$ hydrocarbons | do____ 19 |
| $C_4$ hydrocarbons | do____ 20 |
| $C_5+$ hydrocarbons | do____ 19 |
| Water vapor | do____ 6 |

In the condensation of a gaseous stream such as that indicated in Table I, it is desirable to secure the condensation of as great a portion of the $C_3$, $C_4$ and $C_5$ hydrocarbons as possible together with the crude gasoline fraction. As will be seen, the condensation apparatus of this invention is well adapted to achieve this objective.

The manner in which a gas stream such as that indicated in Table I is condensed in accordance with this invention, will be understood by reference to Figure 1. Referring to Figure 1, the vertical tower 1 illustrated constitutes the two-stage direct contact condenser of this invention. The tower 1 is preferably filled with a suitable contacting means such as packing material, bubble cap plates, or, as illustrated, the type of packing known as disc and donut packing. At a central portion of the tower, an annular ring 2 is provided serving as a liquid accumulator from which liquid withdrawals may be made through line 3. An inlet 4 for the gaseous vapors to be condensed is provided at the bottom of the tower and, an inlet 5 for the cooling water to be employed is positioned at the top of the tower. The gaseous stream introduced through 4 consisting, as indicated, of substantially uncondensable gases, light condensable gases and heavy condensable gases moves upwardly through the tower. In the lower portion of the tower, contact with water dropping downwardly through the tower causes condensation of the heavy condensable gases although not causing any substantial condensation of the light condensable gases. As a result, the material withdrawn from the bottom of the tower through line 6 consists of a mixture of water and the condensed heavier components of the initial gas feed introduced through line 4. The condensed gases and the water may be separated on passing the stream of line 6 to a separation drum 7 wherein phase separation occurs permitting withdrawal of water from the lower portion of the settling drum through line 8 and permitting withdrawal of the condensed heavy ends from the upper portion of the settling drum through line 9. The water of line 8 may be disposed of as desired, while the hydrocarbons of line 9 are recycled to the top of tower 1 for re-introduction to the tower. The heavy naphtha thus re-introduced to the tower moves downwardly through the tower together with cooling water introduced through line 5. As a consequence, condensable gases which have passed upwardly through the tower to the upper section are condensed by contact with the cooling water and the recycled heavy naphtha so as to permit absorption of these condensable gases in the heavy naphtha. Consequently, the liquid accumulating on the annular liquid accumulator ring 2 comprises a mixture of water and the heavy naphtha together with light condensable gases. This mixture may be separated by withdrawing the liquid on the accumulator ring 2 through line 3 for separation in the separation drum 10. In drum 10 a phase separation again occurs to permit removal of the condensed hydrocarbons from the upper portion of drum 10 through line 11, and to permit removal of the water from the lower portion of drum 10 and through line 12. This water is returned to the lower portion of tower to act as a direct contact condensing medium in the lower portion of the tower. In some cases it is desirable to return a portion of the condensed hydrocarbons to the lower portion of the tower through line 32.

In the operation of the tower described, condensation of a composition of the nature indicated in Table I may be controlled as follows: In the lower section of the tower, the $C_5$ and heavier fraction of the gas input constituting the crude gasoline fraction is readily condensed; little condensation of $C_4$ or lighter fractions occurs in the lower portion of the tower. However, on recycle of the condensed heavier fraction to the top of the tower, in conjunction with the cooling water there present, condensation of the $C_3$, $C_4$ and any remaining $C_5$ hydrocarbons can occur. As a result, the gasoline accumulating on condensate ring 2 is rich in $C_3$, $C_4$ and $C_5$ hydrocarbons. It is apparent, therefore, that the operation of the tower illustrated permits the effective direct contact condensation of a wide boiling gas stream so as to minimize the loss of the less readily condensable constituents of the gas stream. This occurs by virtue of the fact that the heavy condensable recycle provided to the top of the tower minimizes possibility for the escape of light condensable gases from the top of the tower. As a result, uncondensed gases withdrawn through line 13 at the top of tower 1 comprise principally inert gases or the more volatile portions of the feed gas. By this technique therefore, the outgoing gases are brought into substantial equilibrium with the heavy components of the feed gas at the lowest temperature of the available cooling water.

While the operation of the apparatus of Figure 1 may be considered in the manner described, the essence of this invention may be emphasized in somewhat different terms. Thus, while condensation of hydrocarbons occurs through the tower as described, in addition, other important and critical effects are secured. In particular, the lower zone of tower 1, below liquid inlet line 12, is operated to strip $C_4$ and lighter constituents from the liquid flowing downwardly through this zone. The heat input of the vapor stream of line 4 maintains the bottom of tower 2 at a sufficiently high temperature to secure the desired stripping action. This permits approach to the optimum condition characterized by complete stripping of $C_4$ and lighter constituents from the liquid withdrawn from the bottom of the tower through line 6, without stripping $C_5$ and heavier constituents from this liquid stream. To the extent made practical by this stripping action, the liquid stream of line 6, subsequently recycled to the top of tower 1, approaches the optimum absorbent for $C_4$ and lighter constituents, being substantially free of $C_4$ and lighter constituents. In the upper zone of tower 1, therefore, the $C_5$ and heavier stream of recycle line 9, functions efficiently as an absorbent, serving to absorb the $C_3$ and $C_4$ hydrocarbons aided by the direct contact condensing action of the cooling water.

In a very simple operation the process described approaches the ideal absorption operation in which the absorbent liquid entering the top of the tower is completely free of the components to be absorbed while having a sufficiently low volatility to avoid loss from the top of the tower in vapor form. This operation depends upon the stripping in the bottom of tower 1 to eliminate $C_4$ and lighter constituents from the liquid bottoms stream and depends upon the absorption effect in the top of tower 1 to minimize escape of $C_4$ and lighter constituents at the top of the tower. These effects are an important adjunct to the direct contact condensation provided by the cooling water employed in tower 1.

The description of the process presented has assumed a cut point between $C_4$ and $C_5$ hydrocarbons. While this is the preferred operation to maximize recovery of $C_3$ to $C_5$ hydrocarbons in the naphtha withdrawn from the system if desired, the cut point may be chosen at any level.

A second embodiment of this invention is illustrated in Figure 2 of the drawing including features not employed in Figure 1. Referring to Figure 2, the two-stage direct contact condenser is designated by numeral 15. The general arrangement of the feed lines for the gas and the cooling water to be introduced is substantially as illustrated in Figure 1. Thus, the gas to be condensed is introduced to the bottom of the tower through line 16, while the cooling water is introduced to the top of the tower through line 17. Again, tower 15 is provided with a suitable packing material such as Raschig rings, bubble cap plates or any other desired type of contacting aids. Again, a liquid accumulating arrangement 18 is positioned at an intermediate portion of the tower so as to permit accumulation of all liquid dropping downwardly at this portion of the tower. As shown, however, the arrangement of Figure 2 employs a central panlike element 18 immediately below an annular baffle arrangement 19 of a nature to permit upflow of gas past pan 18 and baffle 19 but of a nature to prevent passage of liquid downwardly around pan 18. A tubular standpipe 20 is positioned within the pan 18 extending above the bottom of the pan 18 but not extending to the upper termination of the pan. As will be seen, this arrangement permits the liquid accumulator 18 to serve as a separation means. In a somewhat similar fashion, a standpipe 21 is positioned at the bottom of vessel 15 to serve a similar function.

In the operation of the apparatus of Figure 2, the gas stream introduced through line 16 will be subjected to essentially the same action as described in connection with Figure 1. Thus, readily condensable portions of the gas stream will be condensed in the lower portion of the tower concomitant with the stripping of lighter constituents from the liquid present. The liquid drops downwardly so as to accumulate at the bottom of the tower together with the cooling water. By virtue of the standpipe 21, the lower portion of the tower acts as a phase separation means so that the condensed hydrocarbons may be withdrawn through standpipe 21, while the lower liquid phase consisting of water may be withdrawn through line 33. The condensed heavy ends withdrawn from standpipe 21 through line 22 are introduced by means of a pump to the bottom of a direct contacting vessel 23. Cooling water is introduced to the top of vessel 23 through line 24. As a result, the water dropping downwardly through tower 23 countercurrent to the flow of hydrocarbons upwardly through tower 23 will cause cooling of the liquid hydrocarbons. It is apparent that vessel 23 may be provided with any desired contacting means such as packing to permit the effective contact of the cooling water and heavy naphtha. It should be observed that unlike tower 15, tower 23 is operated as a liquid-liquid contacting tower. The minimum quantity of water is introduced to tower 23 through line 24 which will bring the temperature of the liquid stream of line 26 to a few degrees above the temperature of the cooling water.

The cooled hydrocarbons withdrawn from the top of tower 23 through line 26 are then re-introduced to tower 15 at the top of the tower. The cooled, condensed heavy hydrocarbons of line 26 then drop downwardly through tower 15 together with cooling water introduced through line 17. As a consequence, condensable hydrocarbons remaining in the gaseous phase in the upper portion of tower 15 will be condensed and absorbed in the heavy liquid hydrocarbons. Consequently, the liquid accumulating in pan 18 will constitute a mixture of the cooling water together with condensed hydrocarbons including the absorbed, more volatile hydrocarbons. Separation occurs in pan 18 to permit removal of a suitable portion of the upper hydrocarbon phase through line 28 associated with standpipe 20, and to permit removal of the lower water phase through line 29. Preferably, withdrawal of hydrocarbons from separator 18 through line 28 is controlled to permit overflow of a portion of the hydrocarbons into the lower section of the tower. Water withidrawn through line 29 is in part re-introduced to tower 15 through line 30 and is in part introduced to an intermediate portion of tower 23 through line 31. The quantity of water re-introduced to tower 15 through line 30 is determined by balancing the condensing requirements with the stripping requirements in the lower portion of the tower. In particular, sufficient water is introduced to the lower section of the tower through line 30 to provide adequate condensation to maintain sufficient liquid flow in lines 22 and 26. As indicated, however, in general, it is not necessary to pass all of the cooling water into the lower portion of the tower so that a substantial portion may be passed through line 31 to act as a direct cooling medium in tower 23.

As described therefore, the apparatus of Figure 2 functions in essentially the same manner as the apparatus of Figure 1. However, while the separation of hydrocarbons and water was externally achieved in Figure 1, this separation is internally achieved in Figure 2. Figure 2 again differs from Figure 1 in that direct contact cooling of the recycled heavy ends is provided exterior to the principal contacting tower, while in Figure 1 cooling of the recycled heavy ends occurs at the upper portion of the principal contacting tower. Figure 2 again differs from Figure 1 in that the water not required in the lower part of the condenser 15, can be used in direct contact cooler 23. In this way, minimum total consumption of cooling water is achieved.

As described therefore, this invention concerns the direct contact condensation of a gaseous stream including a readily condensable fraction and a more volatile fraction. In accordance with this invention, a direct contact condensing medium such as water is employed. The condensing medium may be any liquid substantially immiscible with constituents of the gas to be condensed and having a temperature sufficiently low to permit condensation of the gas. In one stage of the condensing process conducted in the lower section of the apparatus described, the readily condensable fraction of the gas stream is condensed. These condensed heavy ends are then separated from the cooling medium and are recirculated to the upper portion of the apparatus. In the upper portion of the apparatus, a second stage of contacting is carried out permitting direct contact of uncondensed fractions of initial feed gas with cooling water and with the recycled heavy ends. This results in the condensation and absorption of the more volatile fractions in the heavy ends. Provision is made at the central part of the apparatus for the withdrawal of the final condensed product including the absorbed light fractions. This invention results in maximum condensate product while using minimum cooling water.

What is claimed is:

1. The process of condensing mixed heavy and light hydrocarbon vapors comprising the steps of introducing said vapors into a condensing zone at the higher temperature end thereof, condensing in said zone a liquid relatively rich in heavy hydrocarbons and capable of absorbing light hydrocarbon vapors, withdrawing all of said liquid from said zone at said higher temperature end, introducing all of said liquid into an absorption zone at one end thereof, introducing a liquid coolant immiscible with said vapors into said absorption zone at substantially the same point at which said liquid relatively rich in heavy hydrocarbons is introduced, whereby said point is maintained at the lowest temperature in said absorption zone, introducing light hydrocarbon vapors from said condensing zone into said absorption zone at the end opposite said low temperature point, contacting said light hydrocarbon vapors with said coolant and said liquid rich in heavy hydrocarbons in said absorption zone whereby said light hydrocarbon vapors are absorbed to form a liquid mixture of light and heavy hydrocarbons, and a treated gas from which light hydrocarbon vapors have been removed, withdrawing said gas from said absorption zone adjacent said point of lowest temperature, withdrawing said liquid hydrocarbon mixture from said absorption zone and introducing at least a portion thereof into said condensing zone, contacting said liquid mixture and said mixed vapors countercurrently in said condensing zone whereby light hydrocarbons are stripped from said liquid mixture, withdrawing liquid relatively rich in heavy hydrocarbons and of increased absorptive capacity from said condensing zone, introducing the same into said absorption zone adjacent said point of lowest temperature, withdrawing said liquid coolant from said absorption zone, and introducing said liquid coolant into said condensing zone at the end opposite that at which said vapors are introduced.

2. The process according to claim 1 wherein said liquid rich in heavy hydrocarbons is cooled prior to introduction into said absorption zone.

3. The process according to claim 1 wherein said liquid mixture of hydrocarbons and said coolant are withdrawn from said absorption zone together and separated outside of said absorption zone.

4. The process according to claim 1 wherein said liquid mixture of hydrocarbons and said coolant are separated from one another in said absorption zone.

References Cited in the file of this patent

UNITED STATES PATENTS

| | | |
|---|---|---|
| 963,401 | Solvay | July 5, 1910 |
| 1,487,768 | Torrey, Jr. | Mar. 25, 1924 |
| 1,722,458 | De Baufre | July 30, 1929 |
| 1,808,087 | Urquhart | Jan. 2, 1931 |
| 2,198,142 | Wade | Apr. 23, 1940 |
| 2,333,193 | Persson et al. | Nov. 2, 1943 |
| 2,363,527 | Horsley et al. | Nov. 28, 1944 |
| 2,366,360 | Semon | Jan. 2, 1945 |
| 2,493,981 | Latchum, Jr. | Jan. 10, 1950 |

FOREIGN PATENTS

| | | |
|---|---|---|
| 176,499 | Great Britain | Mar. 7, 1922 |
| 355,990 | Germany | July 17, 1922 |